United States Patent [19]

Grimm et al.

[11] Patent Number: 4,617,111

[45] Date of Patent: Oct. 14, 1986

[54] METHOD FOR THE SEPARATION OF A MIXTURE OF POLYVINYL CHLORIDE AND POLYETHYLENE TEREPHTALATE

[75] Inventors: Michael J. Grimm, Maumee; Trannie R. Sehlmeyer, Toledo, both of Ohio

[73] Assignee: Plastic Recycling Foundation, Inc., Washington, D.C.

[21] Appl. No.: 759,217

[22] Filed: Jul. 26, 1985

[51] Int. Cl.$^4$ ............................................. B03B 1/00
[52] U.S. Cl. ......................................... 209/4; 209/2; 209/167; 209/173; 521/46.5
[58] Field of Search ....................................... 209/1–4, 209/7, 11, 166, 167, 172, 173; 521/46.5, 48

[56] References Cited

U.S. PATENT DOCUMENTS

| | | | |
|---|---|---|---|
| 3,925,200 | 12/1975 | Izumi et al. | 209/11 |
| 4,031,039 | 6/1977 | Mizumoto et al. | 521/46.5 |
| 4,071,479 | 1/1978 | Broyde et al. | 521/46.5 |
| 4,078,916 | 3/1978 | Gerber et al. | 521/48 |
| 4,132,633 | 1/1979 | Saitoh et al. | 209/167 |
| 4,578,184 | 3/1986 | Rasmussen | 209/3 |

FOREIGN PATENT DOCUMENTS 2423364  2/1975  Fed. Rep. of Germany ...... 209/166

*Primary Examiner*—Robert B. Reeves
*Assistant Examiner*—Donald T. Hajec
*Attorney, Agent, or Firm*—Emch, Shavver, Schaub & Porcello Co.

[57] ABSTRACT

A method for the separation of a mixture of polyvinyl chloride particles and polyethylene terephtalate particles comprising the steps of applying a solution composed of a low density solvent of polyvinyl chloride, water and sodium hydroxide to flakes of polyvinyl chloride and polyethylene terephtalate whereby the polyvinyl chloride absorbs the solvent contained in the solution, which changes the density of the polyvinyl chloride so that it is less than the density of the polyethylene terephtalate. The plastics may then be differential density separated by flotation or centrifugation and recovered.

13 Claims, No Drawings

METHOD FOR THE SEPARATION OF A MIXTURE OF POLYVINYL CHLORIDE AND POLYETHYLENE TEREPHTALATE

BACKGROUND OF THE INVENTION

The invention relates to a method for the separation of a mixture of plastics. More particularly, it is directed to a method for separating flakes of polyvinyl chloride (PVC) from flakes of polyethylene terephthalate (PET) by the application to the flakes of a solution composed of a low density solvent of PVC, water ($H_2O$) and sodium hydroxide (NaOH).

For many years there has been the problem of separating different kinds of plastics which have been mixed together in a recycling situation. Usually, plastic bottles made of various types of plastics are brought to recycling stations where they are ground into flakes. Quite often, the bottles are not separated according to the plastic of which they are composed before they are ground into flakes. As a result of this practice, flakes of different plastics are randomly mixed together. The separation of these flakes becomes difficult when the physical properties of the plastics make separation by standard flotation and melting techniques impossible. Two such plastics with almost identical physical properties are PVC and PET. PVC and PET are the primary types of plastics used in the production of plastic bottles and other containers. It is important to recover these plastics by recycling in order to preserve the environment, conserve energy and reduce cost.

Previous prior art methods of separating a mixture of plastics can be found, for example, in U.S. Pat. Nos. 3,925,200; 3,926,790; 3,926,791; and 4,132,633. These prior art references disclose the general concept of separating a mixture of plastics by flotation after a conditioning agent has been added to the mixture.

The present invention provides for an improved method of separating particles or flakes of PVC from particles or flakes of PET.

SUMMARY OF THE INVENTION

The present invention relates to a method for the separation of a mixture of PVC and PET comprising the steps of applying a solution composed of a low density solvent of PVC, $H_2O$ and NaOH to flakes of PVC and PET whereby the PVC absorbs the low density solvent which changes the density of the PVC so that it is less than the density of the PET. The modified materials having different densities may then be separated by flotation or by centrifugation and the individual plastics recovered.

It is the primary object of the present invention to provide a method for the separation of a mixture of PVC and PET.

A further object of the present invention is to provide a method for the separation of a mixture of PVC and PET which can be accomplished easily and effectively.

DETAILED DESCRIPTION OF THE INVENTION

The present invention relates to a method for the separation of a mixture of plastics composed of particles or flakes of PVC and PET.

PVC and PET are difficult to separate because their physical properties are very similar. Their densities, 1.34 grams/cc for PET and 1.32 grams/cc for PVC, cause standard differential density separation to be impracticable.

According to the invention, a solution composed of a low density solvent of PVC which has a density of less than 0.95 grams/cc, $H_2O$ and NaOH is applied to the mixed particles or flakes of PVC and PET. Examples of low density solvents of PVC which have densities of less than 0.95 grams/cc are alcohols, ketones, esters and ethers. For the purpose of explanation, methyethyl ketone (MEK) will be used as the low density solvent. MEK has a density of 0.80 grams/cc.

the mixture of flakes of PVC and PET is present in a proportion of from about 1 to 3 parts by weight per 100 parts of the solution of MEK, $H_2O$ and NaOH. $H_2O$ is added to the MEK to suppress the tendency of PVC to dissolve, become tacky or to plate onto the PET in the presence of MEK. A small amount of NaOH can be added to the MEK and $H_2O$ in order to accelerate the separation process.

The PVC absorbs the MEK contained in the MEK, $H_2O$ and NaOH solution. As a result of the MEK absorption, the density of the PVC changes from its original density of 1.32 grams/cc to a significantly lower density. The PET retains its original density of 1.34 grams/cc during the process because it is insoluable in MEK. The newly lowered density of the PVC allows it to be differential density separated from the PET ether by flotation in a flotation cell or centrifugation. The plastics may then be recovered individually.

EXPERIMENTAL DATA

Test formulas, physical properties and comparative experimental data are set out below.

| Trial | I | II | III | IV | V | VI | VII | VIII | IX | X | XI | XII | XIII |
|---|---|---|---|---|---|---|---|---|---|---|---|---|---|
| MEK/ | 90** | 90 | 90 | 85 | 80 | 70 | 25 | 90 | 90 | 95 | 90 | 90 | 90 |
| Water/ | 10 | 10 | 10 | 15 | 20 | 30 | 75 | 9.6 | 9.6 | 4.8 | 9.6 | 9.6 | 9.6 |
| NaOH | 0 | 0 | 0 | 0 | 0 | 0 | 0 | .4 | .4 | .2 | .4 | .4 | .4 |
| Temp °C. | 23 | 32 | 42 | 23 | 23 | 23 | 26 | 41 | 63 | 61 | 62 | 62 | 50 |
| Mass | xx | xx | xx | .14 | .14 | .41 | .43 | .13 | .09 | .12 | .13 | .16 | .10 |
| Color | white | white | white | white | white | white | white | white | white | white | clear | white | white |
| Thickness | | | | | | | | | | | | | |
| Time (min) | 1.34 | | Density Range (PVC) gr/cc | | | | | | | Density Range | | | |
| 1:00 | >1.05 | >1.16 | >1.16 | >1.16 | >1.16 | >1.16 | >1.27 | >1.16 | >1.05 | >1.05 | >1.05 | >1.05 | >1.05 |
| 2:00 | >1.05 | >1.05 | >1.05 | >1.16 | >1.16 | >1.16 | >1.27 | >1.05 | >1.05 | >1.05 | >1.05 | >1.05 | s>1.05 |
| 4:00 | s>1.05 | >1.05 | >1.05 | >1.05 | >1.16 | >1.16 | >1.16 | >1.05 | >1.05 | >1.01 | >1.05 | >1.05 | >1.01 |
| 6:00 | s>1.05 | >1.05 | >1.05 | | | | >1.16 | >1.05 | >1.01 | >.97 | >1.01 | >1.01 | >.97 |
| 8:00 | >1.01 | >1.05 | >1.05 | | | | >1.16 | >1.05 | >.97 | >.97 | >.97 | >.97 | <.97 |
| 10:00 | >1.01 | >1.05 | >1.05 | | | | >1.16 | >1.05 | >.97 | <.97 | <.97 | <.97 | <.97 |
| 12:00 | | | | | | | | | | | | .97 | |
| 14:00 | | | | | | | | | | | | | |
| 16:00 | | | | | | | | | | | | | |
| 18:00 | | | | | | | | | | | | | |

-continued

| | | | | | | | | | | | | |
|---|---|---|---|---|---|---|---|---|---|---|---|---|
| Mass | xx | xx | xx | .18 | .13 | .45 | .52 | .17 | .12 | .28 | .36 | .20 |
| % Gain | xx | xx | xx | 29 | 8 | 10 | 21 | 31 | 25 | 115 | 125 | 100 |
| Color | xx | xx | xx | white | white | white | white | white | white | cldy. wht | white | white |
| Comments | white not sticky | white not sticky | white not sticky | white not sticky | white not sticky | white not sticky | white thick material | white | white | white broke into pieces | white many small pieces | white not tacky |

| Trial | XIV | XV | XVI | XVII | XVIII | XIX | XX | XXI | XXII | XXIII | XXIV | XXV |
|---|---|---|---|---|---|---|---|---|---|---|---|---|
| MEK/ | 90 | 90 | 90 | 30 | 30 | 30 | 30 | 30 | 30 | 30 | 30 | 30 |
| Water/ | 9.6 | 9.6 | 9.6 | 67.2 | 67.2 | 67.2 | 67.2 | 67.2 | 67.2 | 67.2 | 67.2 | 67.2 |
| NaOH | .4 | .4 | .4 | 2.8 | 2.8 | 2.8 | 2.8 | 2.8 | 2.8 | 2.8 | 2.8 | 2.8 |
| Temp °C. | 55 | 55 | 55 | 50 | 48 | 65 | 62 | 62 | 64 | 65 | 64 | 65 |
| Mass | .12 | .59 | .16 | .16 | .15 | .17 | 1.00 | .19 | .54 | .65 | .15 | .09 |
| Color | white | white | white | clear | clear | clear | clear | clear | white | white | white | white |
| Thickness | | | | | | | | | .019–.021 | .027 | .027–.031 | .021 |
| Time (min) | | | | | | Density Range | | | | | | |
| 1:00 | >1.05 | >1.16 | >1.16 | s>1.16 | >1.16 | s>1.16 | >1.16 | >1.16 | >1.16 | >1.16 | >1.16 | >1.05 |
| 2:00 | >1.05 | >1.16 | >1.05 | >1.05 | >1.16 | >1.05 | >1.16 | >1.16 | >1.05 | >1.05 | >1.05 | >1.05 |
| 4:00 | >1.05 | s>1.16 | >1.05 | >1.05 | >1.05 | s>1.05 | >1.05 | >1.05 | >1.05 | >1.05 | >1.05 | >1.05 |
| 6:00 | s>1.05 | >1.05 | >1.05 | >1.01 | >1.05 | >1.01 | >1.05 | >1.05 | *>1.01 | >1.05 | >1.05 | >1.01 |
| 8:00 | >1.01 | >1.05 | s>1.05 | >1.01 | >1.01 | >.97 | s>1.05 | >1.05 | *>.97 | >1.05 | >1.01 | *>1.01 |
| 10:00 | >.97 | >1.05 | >1.01 | >.97 | >1.01 | >.97 | >1.01 | >1.05 | *>.97 | >1.05 | *>1.01 | *>.97 |
| 12:00 | >.97 | >1.05 | >1.01 | >.97 | >.97 | <.97 | >1.01 | >1.05 | *=.97 | >1.01 | *>1.01 | *>.97 |
| 14:00 | s>.97 | >1.05 | >1.01 | s>.97 | s>.97 | <.97 | >1.01 | >1.05 | *<.97 | *>1.01 | *>.97 | *>.97 |
| 16:00 | <.97 | >1.05 | s>1.01 | s>.97 | s>.97 | xx | >1.01 | >1.01 | | *>.97 | *>.97 | *>.97 |
| 18:00 | <.97 | >1.05 | >.97 | <.97 | s>.97 | xx | >1.01 | >1.01 | | *>.97 | *s>.97 | *=.97 |
| Mass | .28 | .96 | .26 | .31 | .29 | .35 | 1.43 | .28 | 1.05 | 1.13 | .29 | .17 |
| % Gain | 133 | 63 | 63 | 94 | 93 | 106 | 43 | 47 | 94 | 74 | 93 | 89 |
| Color | white | white | white | white | white | white | white | white | white | white | white | white |
| Thickness | | | | | | | | | .01–.012 | .025 | .018–.025 | .024 |
| Comments | not tacky | threaded part of the bottle | | | | | | | threaded section of bottle | Handle of | Bottom of Bottle | Bottom of Bottle | Side Wall Bottle |

| Trail | XXVI | XXVII | XXVIII | XXIX | XXX | XXXI | XXXII | XXXIII | XXXIV | XXXV | XXXVI |
|---|---|---|---|---|---|---|---|---|---|---|---|
| MEK/ | 21 | 21 | 30 | 30 | 80 | 90 | 90 | 90 | 30 | 30 | 30 |
| Water/ | 76 | 76 | 67.2 | 67.2 | 19.2 | 9.6 | 9.6 | 9.6 | 68.9 | 68.6 | 68.6 |
| NaOH | 3 | 3 | 2.8 | 2.8 | .8 | .4 | .4 | .4 | 1.4 | 1.4 | 1.4 |
| Temp °C. | 54 | 54 | 58 | 58 | 58 | 58 | 67 | 67 | 58 | 58 | 72 |
| Mass | .07 | .07 | .06 | .06 | .05 | .055 | .07 | .09 | .05 | .06 | .06 |
| Color | clear | white | clear | clear | clear | clear | clear | clear | clr | clr | clr |
| Thickness | sphere | .026 | sphere | .021 | sphere | sphere | sphere | sphere | .019 | .024 | .022 |
| Time (min) | | | | | | Density Range | | | | | |
| 1:00 | >1.22 | >1.19 | >1.22 | >1.21 | >1.19 | >1.22 | >1.19 | >1.15 | >1.15 | >1.15 | >1.15 |
| 2:00 | >1.15 | >1.15 | s>1.22 | =1.19 | =1.19 | >1.19 | >1.15 | >1.08 | >1.08 | >1.08 | >1.08 |
| 4:00 | >1.22 | >1.08 | >1.19 | >1.08 | >1.15 | >1.15 | >1.08 | >1.02 | >1.02 | >1.08 | >1.02 |
| 6:00 | >1.19 | >1.02 | >1.15 | *>1.02 | =1.15 | >1.08 | >1.02 | >1.02 | *>.97 | >1.02 | *>.97 |
| 8:00 | >1.19 | >1.02 | >1.15 | *>.97 | >1.08 | >1.08 | >1.02 | =1.02 | *>.97 | *>1.02 | *>.97 |
| 10:00 | >1.19 | >1.02 | >1.08 | *>.97 | >1.08 | >1.08 | >.97 | >.97 | *>.97 | *>.97 | *>.97 |
| 12:00 | >1.19 | >1.02 | >1.08 | *>.97 | =1.08 | >1.08 | >.97 | >.97 | *>.97 | *>.97 | *>.97 |
| 14:00 | >1.08 | >1.02 | >1.08 | *>.97 | >1.02 | >1.02 | >.97 | >.97 | *>.97 | *>.97 | *>.97 |
| 16:00 | >1.08 | >1.02 | >1.08 | *>.97 | >1.02 | >1.02 | >.97 | >.97 | *>.97 | *>.97 | *>.97 |
| 18:00 | >1.08 | >1.02 | >1.08 | *<.97 | >1.02 | >1.02 | >.97 | =.97 | *s>.97 | *>.97 | *>.97 |
| Mass | .09 | .09 | .09 | .12 | .06 | .068 | .11 | .15 | .09 | .11 | .11 |
| % Gain | 29 | 29 | 50 | 100 | 20 | 24 | 57 | 66 | 80 | 83 | 83 |
| Color | cldy. wht | white | cldy. wht | cldy. wht | cldy. wht | cldy. wht | cldy. wht | cldy. wht | cldy. wht | cldy. wht | cldy. wht |
| Thickness | sphere | .031 | sphere | .026 | sphere | sphere | sphere | sphere | .027 | .030 | .030 |
| Comments | Resin Pellets | Side Wall | Resin Pellet | Side Wall | pellet 2-phase | sphere pellet | pellet | pellet | | | |

| Trial | XXXVII | XXXVIII | XXXIX | XL | XLI | XLII | XLIII | XLIV | XLV | XLVI | XLVII |
|---|---|---|---|---|---|---|---|---|---|---|---|
| MEK/ | 30 | 30 | 30 | 90 | 30 | 30 | 90 | 90 | 30 | 90 | 90 |
| Water/ | 65.8 | 65.8 | 65.8 | 9.4 | 64.4 | 64.4 | 9.2 | 9.2 | 63.0 | 9.0 | 9.0 |
| NaOH | 4.2 | 4.2 | 4.2 | 6 | 5.6 | 5.6 | .8 | .8 | 7 | 1.0 | 1.0 |
| Temp °C. | 69 | 50 | 35 | 58 | 58 | 63 | 62 | 62 | 58 | 60 | 60 |
| Mass | .04 | .083 | .075 | .078 | .099 | .098 | .09 | .117 | .093 | .089 | .089 |
| Color | clr | clear | clear | clear | clear | clear | clear | clear | clear | clear | clear |
| Thickness | .019 | .020 | .022 | .018 | .022 | .022 | .020 | sphere | .018 | .018 | sphere |
| Time (min) | | | | | | Density Range | | | | | |
| 1:00 | >1.08 | 1.15 | >1.15 | >1.08 | >1.15 | =1.15 | s>1.08 | >1.22 | *>1.08 | >1.02 | >1.19 |
| 2:00 | *>1.02 | >1.08 | >1.08 | >1.02 | >1.08 | *>1.08 | s>1.02 | =1.19 | *>1.02 | >.97 | >1.15 |
| 4:00 | *>.97 | =1.08 | >1.08 | =1.02 | *>1.02 | *>1.02 | >.97 | >1.08 | *s>1.02 | <.97 | >1.08 |
| 6:00 | *>.97 | *>1.02 | >1.02 | s>.97 | *>.97 | *>.97 | =.97 | >1.08 | *>.97 | | >1.08 |
| 8:00 | *>.97 | *>.97 | >1.02 | <.97 | *>.97 | *s>.97 | >.97 | s>1.08 | *=.97 | | >1.02 |
| 10:00 | *<.97 | *>.97 | *s>1.02 | | *>.97 | *>.97 | | >1.02 | *<.97 | | >1.02 |
| 12:00 | | *>.97 | *=1.02 | | *<.97 | | | >1.02 | | | >1.02 |
| 14:00 | | *<.97 | *>.97 | | | | | >.97 | | | >.97 |
| 16:00 | | | *>.97 | | | | | >.97 | | | >.97 |
| 18:00 | | | *>.97 | | | | | >.97 | | | >.97 |
| Mass | .095 | .157 | .14 | .182 | .197 | .21 | .232 | .181 | .197 | .198 | .134 |

| % Gain | 137 | 89 | 87 | 133 | 99 | 114 | 158 | 55 | 112 | 122 | 51 |
|---|---|---|---|---|---|---|---|---|---|---|---|
| Color | cldy. wht | cldy. wht | clr wht | cldy. wht | cldy. wht | cldy. wht | cldy. wht | cldy. wht | cldy. wht | cldy. wht | cldy. wht |
| Thickness | .027 | .025 | .029 | .026 | .030 | .027 | .027 | sphere | .026 | .022 | sphere |
| Comments | | | | | | | | resin pellet | side wall | side wall | resin pellet |

| Trial | XLVIII | XLIX | L | LI | LII |
|---|---|---|---|---|---|
| MEK/ | 30 | 30 | 90 | 90 | 90 |
| Water/ | 61.6 | 61.6 | 8.8 | 8.8 | 8.8 |
| NaOH | 8.4 | 8.4 | 1.2 | 1.2 | 1.2 |
| Temp °C. | 55 | 55 | 55 | 55 | 45 |
| Mass | .162 | .152 | .167 | .121 | .108 |
| Color | white | clear | white | clear | clear |
| Thickness | .125 | .023 | .125 | .020 | sphere |
| Time (min) | | | Density Range | | |
| 1:00 | >1.19 | *>1.08 | *>1.08 | >1.15 | =1.08 | >1.19 |
| 2:00 | *>1.08 | *=1.08 | >1.08 | >.97 | >1.12 |
| 4:00 | *>1.08 | *=1.02 | >1.02 | <.97 | >1.08 |
| 6:00 | *>1.02 | *>.97 | >1.02 | | >1.08 |
| 8:00 | *>1.02 | *>.97 | >.97 | | >1.08 |
| 10:00 | *>1.02 | *=.97 | >.97 | | >1.02 |
| 12:00 | *>1.02 | *<.97 | >.97 | | >1.02 |
| 14:00 | *=1.02 | | >.97 | | >1.02 |
| 16:00 | *>.97 | | s>.97 | | >1.02 |
| 18:00 | *>.97 | | <.97 | | s>1.02 |
| Mass | .253 | .284 | .287 | .202 | .168 |
| % Gain | 56 | 87 | 72 | 67 | 56 |
| Color | white | cldy. wht | white | cldy. wht | cldy. wht |
| Thickness | .144 | .034 | .151 | .34 | sphere |
| Comments | threaded top of bottle | side wall | threaded top of bottle | side wall | resin pellet |

**Percent by Weight
*floates in upper phase

EXAMPLE I (TRIAL IX)

It has been found (see Trial IX) that the best conditions to arrive at a separation of particles or flakes of PET from PVC is by applying to the flakes a solution containing 90% MEK, 9.2% H₂O and 0.8% NaOH at a temperature between 55° and 65° C. After approximately 5 minutes in the solution, the density of the PVC changes from its original density of 1.32 grams/cc to 0.97 grams/cc. The flakes of PVC can then be separated from the flakes of PET by either flotation or centrifugation.

EXAMPLE II (TRIAL XX) In order to reduce the amount of MEK used in the method, for cost saving reasons, a solution containing 30% MEK, 67.2% H₂O and 2.8% NaOH is applied to the particles of flakes of PVC and PET at a temperature between 60° and 65° C.

After approximately 10 minutes in the solution, the density of the PVC changes from 1.32 grams/cc to approximately 1.01 grams/cc. The flakes of the PVC can then be differential density separated from the flakes of PET by flotation or centrifugation.

The above detailed description of the present invention is given for explanatory purposes. It will be apparent to those skilled in the art that numerous changes and modifications can be made in the examples of the invention described above without departing from the scope of the invention. Accordingly, the whole of the foregoing description is to be construed in an illustrative and not in a limitative sense, the scope of the invention being defined solely by the appended claims.

We claim:

1. A method for the separation of a mixture of polyvinyl chloride particles and polyethylene terephtalate which comprises the steps of:
   (a) applying a solution composed of a solvent of polyvinyl chloride having a density of less than 0.95 grams/cc and water to flakes of polyvinyl chloride and polyethylene terephtalate;
   (b) conditioning said flakes of polyvinyl chloride and polyethylene terephtalate in said solution of solvent and water for a predetermined period of time whereby said flakes of polyvinyl chloride absorb the solvent contained in said solution of solvent and water while said flakes of polethylene terephtalate do not absorb said solvent changing the density of said flakes of polyvinyl chloride so that they have less density than do said flakes of polyethylene terephtalate;
   (c) separating said flakes of polyvinyl chloride from said flakes of polyethylene terephtalate.

2. The method according to claim 1, wherein said solution of solvent and water is composed of from about 30-90%, by weight, solvent and from about 10-70%, by weight, water.

3. The method according to claim 2, wherein said solution of solvent and water also includes from about 0-12%, by weight, sodium hydroxide.

4. The method according to claim 3, wherein said mixture of particles plastic is present in a proportion of from about 1 to 3 parts by weight per 100 parts of said solution of solvent and water.

5. The method according to claim 4, wherein said predetermined period of itme is from about 5-20 minutes.

6. The method according to claim 5, wherein said conditioning is done at a temperature in the range of from about 55° C to 65° C.

7. The method according to claim 1, wherein said solvent is methyethyl ketone.

8. The method according to claim 1, wherein said solvent is an alcohol.

9. The method according to claim 1, wherein said solvent is a ketone.

10. The method according to claim 1, wherein said solvent is an ester.

11. The method according to claim 1, wherein said solvent is an ether.

12. The method according to claim 1, wherein said separation of said flakes of polyvinyl chloride from said flakes of polyethylene terephtalate occurs in a flotation cell.

13. The method according to claim 1, wherein said separation of said flakes of polyvinyl chloride from said flakes of polyethylene terephtalate occurs in a certrifugal separator.

* * * * *